US006360783B2

(12) United States Patent
Faverio, IV et al.

(10) Patent No.: US 6,360,783 B2
(45) Date of Patent: Mar. 26, 2002

(54) THERMAL INSULATING PANELS

(75) Inventors: Louis P. Faverio, IV; Timothy C. Shelton, both of Bear; Michael R. Zimny, Hockessin, all of DE (US)

(73) Assignee: P.T.M. Manufacturing L.L.C., Newark, DE (US)

( * ) Notice: Subject to any disclaimer, the term of this patent is extended or adjusted under 35 U.S.C. 154(b) by 0 days.

(21) Appl. No.: 09/735,736

(22) Filed: Dec. 13, 2000

(30) Foreign Application Priority Data

Dec. 13, 1999 (JP) .......................................... 11-352717

(51) Int. Cl.[7] .................................................. F16L 9/22
(52) U.S. Cl. ........................ 138/149; 138/155; 138/143
(58) Field of Search ................................. 138/149, 155, 138/120, 152, 137, 141, DIG. 4, 147, 143

(56) References Cited

U.S. PATENT DOCUMENTS 4,557,297 A  * 12/1985  Montana ................. 138/149 X
5,460,206 A  * 10/1995  Sansoucy .................... 138/149
5,549,942 A  *  8/1996  Watts ..................... 138/149 X
5,996,643 A  * 12/1999  Stonitsch .................... 138/143
6,161,593 A  * 12/2000  Lardillat et al. ............ 138/149

* cited by examiner

Primary Examiner—Patrick Brinson
(74) Attorney, Agent, or Firm—Connolly Bove Lodge & Hutz LLP

(57) ABSTRACT

Thermal insulating panels for application to HVAC rectangular ductwork each comprise a first layer of solid insulation with a second layer of solid insulation laminated to the first layer. An outer metal layer of embossed aluminum is laminated to the second layer of each panel. These panels are secured to the outside of the rectangular ductwork with at least four interlocking panels, one on each side thereof joined together at the four corners of the ductwork. The outside metal layer of embossed aluminum of at least some of the panels includes right angle flanges along the sides thereof for attachment to an adjacent panel. A number of panels are arranged end-to-end in a series along each side of the rectangular duct, and an overlapping joint is provided between adjacent panels in the series.

10 Claims, 2 Drawing Sheets

THERMAL INSULATING PANELS

BACKGROUND OF THE INVENTION

The present invention relates to thermal insulating panels, and more particularly to thermal insulating panels applied to metal ductwork.

Prior to the present invention, thermal insulation has long been applied to ductwork to minimize heat transfer from such ductwork to the atmosphere and vice versa. When cooling air flows through such ductwork, it is important that losses to the atmosphere be minimized, and under heating conditions it is equally important that heat losses to the atmosphere be minimized. Currently various insulation are used and field applied. These applications consistently fail. Such approaches are short term at best, and before long the insulation often falls away from the ductwork thereby exposing at least part of the ductwork to the atmosphere.

When used outside, it is extremely important that duct insulation insure a weather tight seal. However, in the insulating systems used heretofore this objective was not achieved. Also, in the past, insulating systems have failed to provide a thermal, weatherproof, antibacterial system for outside ductwork.

SUMMARY OF THE INVENTION

Accordingly, it is an object of the present invention to provide thermal insulating panels particularly constructed for application to ductwork for insulating the ductwork in a highly efficient and dependable manner.

Another object of the present invention is the provision of thermal insulating panels which are simple in construction but easy to use in the insulation of ductwork in both inside and outside installations.

Still another object of the present invention is a system of thermal insulating panels that interconnect and interlock with one another in a highly efficient and dependable manner to provide a thermal, waterproof, antibacterial system.

Another object of the present invention is a plurality of interlocking thermal insulating panels that provide a weather tight seal when assembled on the outside of rectangular ductwork.

In accordance with the present invention, thermal insulating panels for application to HVAC rectangular ductwork comprise a first layer of solid insulation, a second layer of solid insulation laminated to the first layer, and an outer metal layer laminated to the second layer. The first and second layers may be made from polyisocyanurate insulation, and collectively they have a insulation value of at least R-14. The outer metal layer preferably comprises embossed aluminum.

An insulated ductwork comprises a rectangle duct with four corners, and at least four interlocking insulating panels, one on each side of the rectangular duct joined together at the four corners of the duct. The outer embossed aluminum layer of at least some of the panels in this four panel arrangement includes right angle flanges along the panel sides thereof for attachment to an adjacent panel in that arrangement. Each side of the rectangular duct may include a plurality of thermal insulating panels arranged end-to-end in a series along each side of the rectangular duct. Adjacent panels in the series are joined together in overlapping relationship with one another.

The rectangular duct may include a plurality of sections arranged end-to-end in a series with outwardly extending peripheral flanges on each duct section at the ends thereof. The peripheral flanges of adjacent duct sections are connected together, and the first layer of solid insulation of each insulating panel may include cut-out portions to accommodate the interconnected flanges of the duct sections.

BRIEF DESCRIPTION OF THE DRAWINGS

Novel features and advantages of the present invention in addition to those noted above will become apparent to persons of ordinary skill in the art from a reading of the following detailed description in conjunction with the accompanying drawings wherein similar reference characters refer to similar parts and in which.

DETAILED DESCRIPTION OF THE INVENTION

Figure 1:
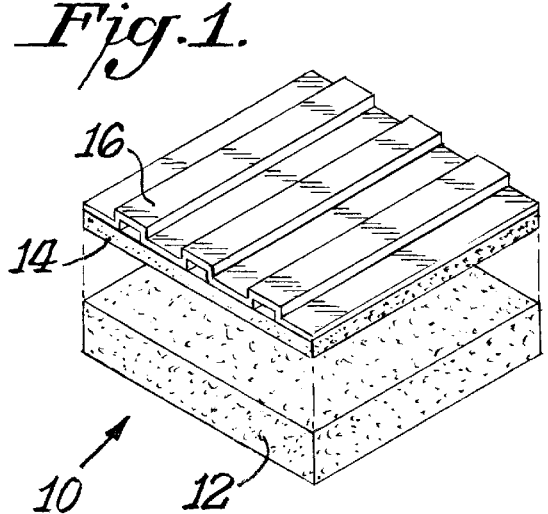
FIG. 1 is an exploded perspective view of a thermal insulating panel, according to the present invention.
Figure 2:
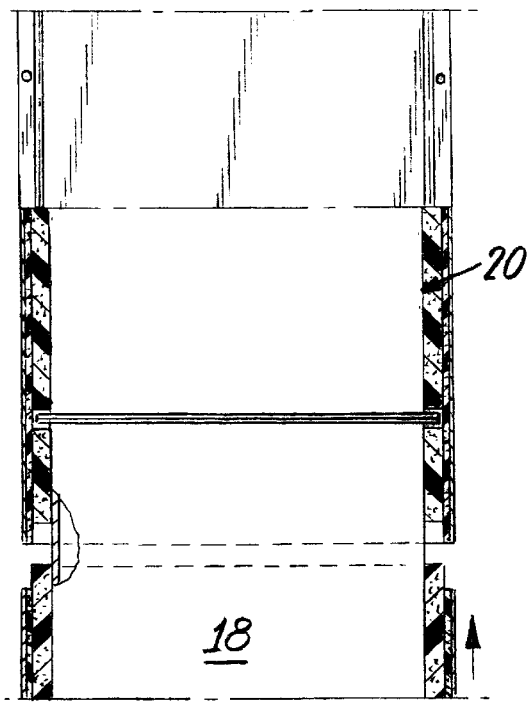
FIG. 2 is a cross-sectional elevational view of the thermal insulating panel of FIG. 1 applied to vertical rectangular ductwork, according to the present invention.

Referring in more particularity to the drawings, FIG. 1 illustrates a thermal insulating panel 10 of the present invention comprising of first relatively thick layer 12 of solid insulation, a second relatively thinner layer 14 of solid insulation laminated to the first layer, and a thin outer metal layer 16 laminated to the second layer 14.

The first and second layers 12, 14 may be made from a polyisocyanurate insulation, and collectively these layers preferably have an insulation value of at least R-14. The outer metal layer 16 preferably comprises embossed aluminum, although other sheet metal goods may also be used.

The thermal insulating panels 10 are used on HVAC rectangular ductwork 18 to insulate that ductwork. These panels may be used on both inside and outside installations. As explained more fully below, the panels 10 interlock with one another to provide a weather tight seal as well as preserving a high thermal insulation value. When insulated the interlocking panels 10 prevent air penetration as well as the intrusion of water and water vapors. As a result, air quality issues are virtually eliminated.

Figure 5:
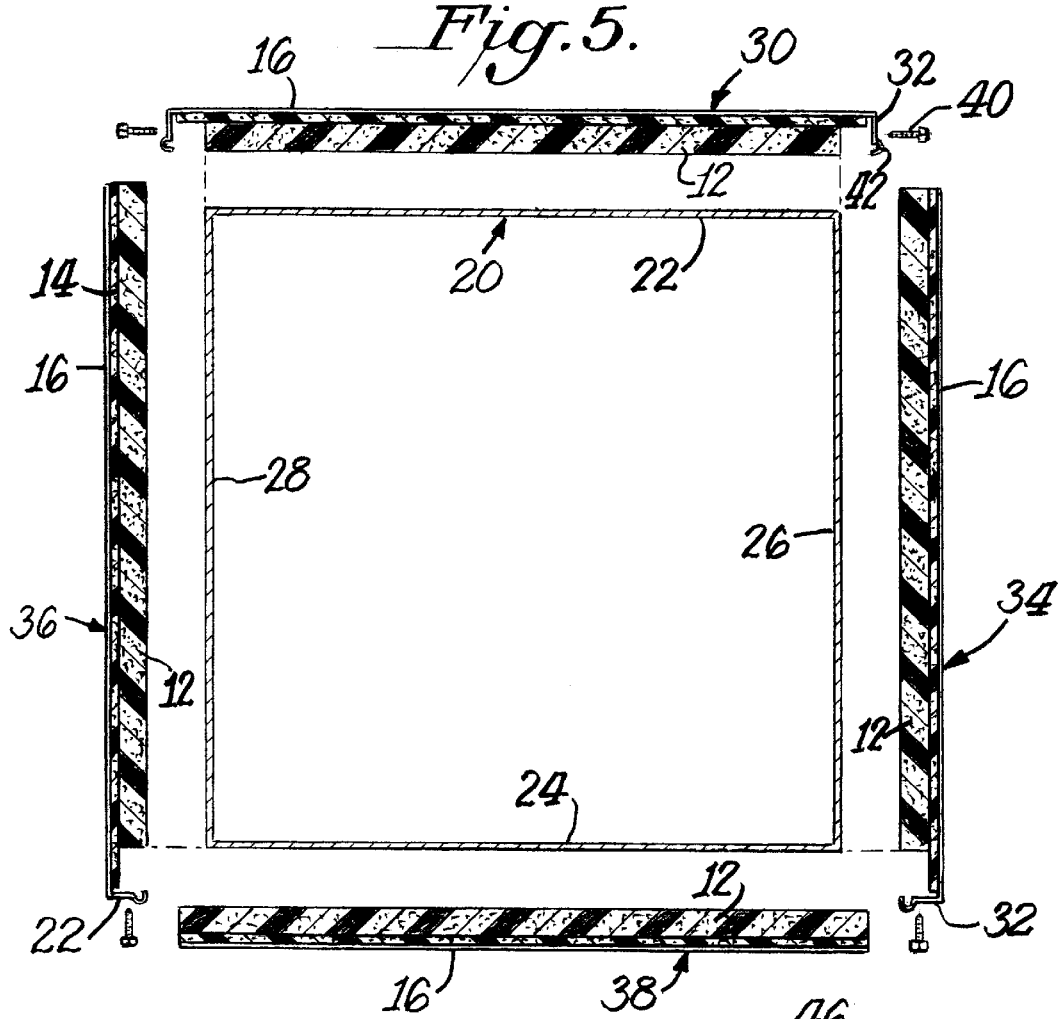
FIG. 5 is an exploded side elevational view in cross-section showing horizontal rectangular ductwork with thermal insulating panels on the outside thereof, according to the present invention.
Figure 6:
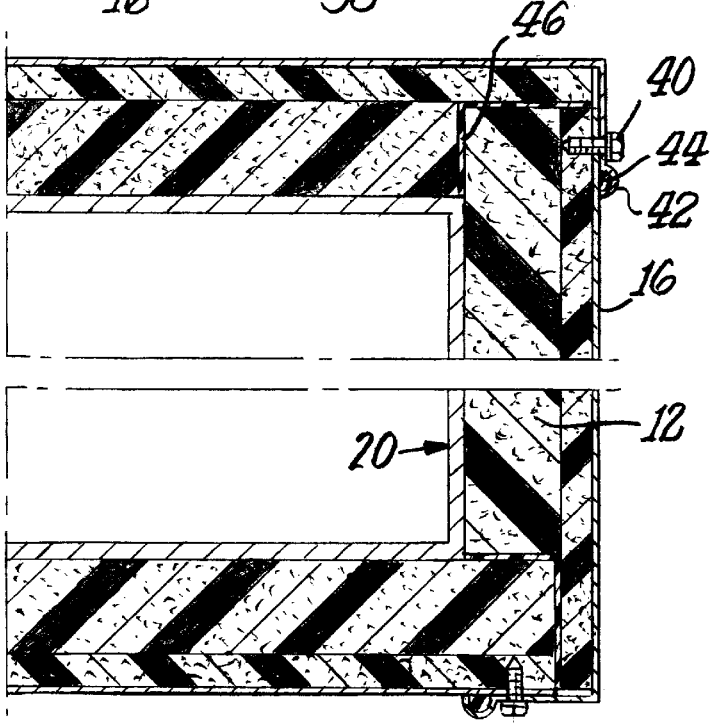
FIG. 6 is an enlarged side elevational view in cross-section illustrating part of a horizontal rectangular ductwork with thermal insulating panels applied thereto.

FIGS. 5 and 6 show a horizontal orientated rectangular duct section 20 having opposed upper and lower sides 22, 24 and opposed sides 26, 28. Four thermal insulating panels 10 are utilized for application to the four sides of the duct section 20. Top panel 30 has an outer metal layer that includes down turned right angle flanges 32 along the panel sides for attachment to adjacent panels. The first layer 12 of solid insulation is spaced inwardly from the flanges 32 so that the side panels 34, 36 are fitted between the first layer and metal flanges of top panel 30. Side panels 34, 36 each include a similar down turned right angle flange 32 at the lower end of each panel. Also, the first layer 12 of panels 34, 36 are spaced from the flanges 32 to accommodate bottom panel 38.

After the panels 30, 34, 36 and 38 are positioned in place, they are secured by sheet metal screws and washers 40 which extend through the flanges 32 and into and through the outer metal layer 16 of an adjacent panel. This relationship is best shown in FIG. 6. Also, the right angle flanges 32 includes recessed portion 42 for accommodating a bead of gasket material 44 which seals the insulating panels together. Foil tape 46 may be applied to all of the exposed corner joints prior to assembly, as best shown in FIG. 6.

Figure 4:
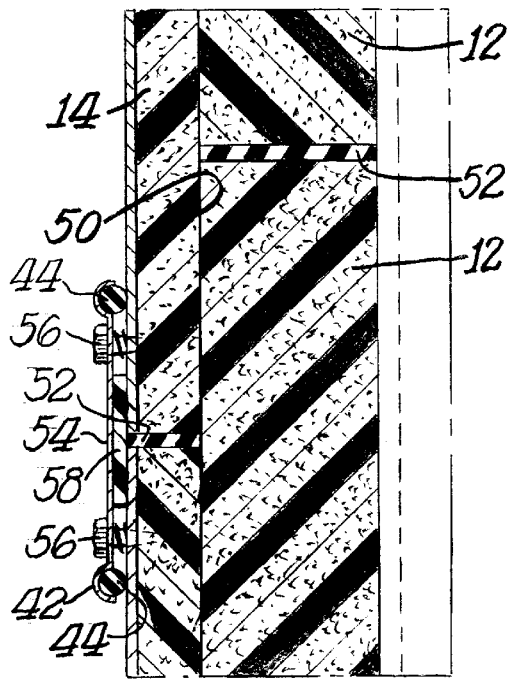
FIG. 4 is an enlarged cross-sectional view in elevation illustrating adjacent thermal insulating panels in abutting and overlapping relationship with one another.

Each side of the rectangular duct 20 may include a plurality of insulating panels arranged end-to-end in a series. As shown in FIG. 4, an overlapping joint 50 extends between adjacent panels in the series. Caulk or similar material 52 is applied between the first layers 12 of adjacent panels in the series, and caulk 52 is also applied between the offset second layers 14 of adjacent panels in the series. A two inch wide beaded band 54 is sealed and secured in place with fasteners 56 applied to the outer metal layer 16 on the outside thereof where the panels are connected together. Also, gasket material 58 is applied over the seam where the second layers abut each other.

Figure 3:
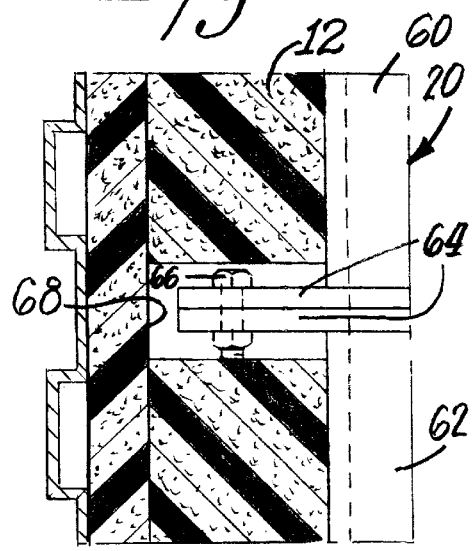
FIG. 3 is an enlarged cross-sectional view in elevation illustrating the thermal insulating panels fitted around the flanged connections of an adjacent duct sections.

In many instances metal ductwork 20 is fabricated from a plurality of sections such as sections 60 and 62, shown in FIG. 3. These sections are arranged end-to-end in a series, and an outwardly extending peripheral flanges 64 on each metal section is connected to the peripheral flange of an adjacent section of the ductwork by suitable fasteners 66. The first layer 12 of the insulating panel in the area of the flanges 64 includes cut-out portions 68 to accommodate the interconnected flanges of adjacent duct sections, such as 60, 62.

The thermal insulating panels of the present invention may be pre-manufactured prior to assembly at the job site. As a result, minimum field alterations are required. The interlocking panels function to prevent air penetration and the intrusion of water and water vapors.

We claim:

1. A thermal insulating panel comprising a first layer of solid insulation, a second layer of solid insulation laminated to the first layer, and an outer metal layer laminated to the second layer, and wherein the outer metal layer comprises embossed aluminum.

2. A thermal insulating panel as in claim 1 wherein the first and second layers are made from polyisocyanurate insulation and collectively have an insulation value of at least R-14.

3. An insulated ductwork comprising a rectangular duct with four corners and at least four interlocking insulating panels, one on each side of the rectangular duct joined together at the four corners of the duct, each panel having a first layer of solid insulation, a second layer of solid insulation laminated to the first layer, and an outer metal layer laminated to the second layer, foil tape between adjacent panels where the panels are joined together at the four corners of the duct and wherein the outer metal layer of at least some of the panels includes right angle flanges along the panel sides thereof for attachment to an adjacent panel.

4. An insulated ductwork comprising a rectangular duct with four corners and at least four interlocking insulating panels, one on each side of the rectangular duct joined together at the four corners of the duct, each panel having a first layer of solid insulation, a second layer of solid insulation laminated to the first layer, and an outer metal layer laminated to the second layer, wherein the outer metal layer of at least some of the panels includes right angle flanges along the panel sides thereof for attachment to an adjacent panel, wherein each side of the rectangular duct includes a plurality of thermal insulating panels arranged end-to-end in a series along each side of the rectangular duct, and an overlapping joint between adjacent panels in the series.

5. An insulated ductwork as in claim 3 wherein the rectangular duct includes a plurality of sections arranged end-to-end in a series, an outwardly extending peripheral flange on each section at the ends thereof connected to the peripheral flange of an adjacent section of duct, and wherein the first layer of solid insulation includes cut-out portions to accommodate the interconnected flanges of the duct sections.

6. A thermal insulating panel as in claim 3 wherein the first and second layers are made from polyisocyanurate insulation and collectively have an insulation value of at least R-14.

7. A thermal insulating panel as in claim 3 wherein the outer metal layer comprises embossed aluminum.

8. An insulated ductwork as in claim 4 wherein the rectangular duct includes a plurality of sections arranged end-to-end in a series, an outwardly extending peripheral flange on each section at the ends thereof connected to the peripheral flange of an adjacent section of duct, and wherein the first layer of solid insulation includes cut-out portions to accommodate the interconnected flanges of the duct sections.

9. A thermal insulating panel as in claim 4 wherein the first and second layers are made from polyisocyanurate insulation and collectively have an insulation value of at least R-14.

10. A thermal insulating panel as in claim 4 wherein the outer metal layer comprises embossed aluminum.

* * * * *